United States Patent [19]
Bettinardi

[11] Patent Number: 5,461,416
[45] Date of Patent: * Oct. 24, 1995

[54] METHOD AND APPARATUS FOR VARIABLE VIDEO MAGNIFICATION

[76] Inventor: Edward R. Bettinardi, 12 Robincrest La., Littleton, Colo. 80123

[ * ] Notice: The portion of the term of this patent subsequent to Jun. 28, 2011 has been disclaimed.

[21] Appl. No.: 262,477

[22] Filed: Jun. 20, 1994

Related U.S. Application Data

[63] Continuation of Ser. No. 869,740, Apr. 16, 1992, Pat. No. 5,325,123.

[51] Int. Cl.⁶ ............................ H04N 7/00; H04N 5/225
[52] U.S. Cl. ................... 348/62; 348/63; 348/64
[58] Field of Search ................... 348/62, 63, 64, 348/61, 65, 207, 345, 362; H04N 5/225

[56] References Cited

U.S. PATENT DOCUMENTS

| | | | |
|---|---|---|---|
| 2,582,728 | 1/1952 | Walker | 348/62 |
| 4,581,648 | 4/1986 | Ganther | 348/344 |
| 5,046,163 | 9/1991 | Priest et al. | 348/63 |

FOREIGN PATENT DOCUMENTS 2623302  3/1989  France .

Primary Examiner—Michael T. Razavi
Assistant Examiner—Bipin Shalwala

[57] ABSTRACT

A video camera including a stopped down lens diameter. An opaque material with a small aperture size is placed over the camera lens. The small aperture allows the user to vary the image size of the object to be viewed by moving the camera toward or away from the object. At the same time the blur circle diameter is maintained within acceptable user limits.

13 Claims, 4 Drawing Sheets

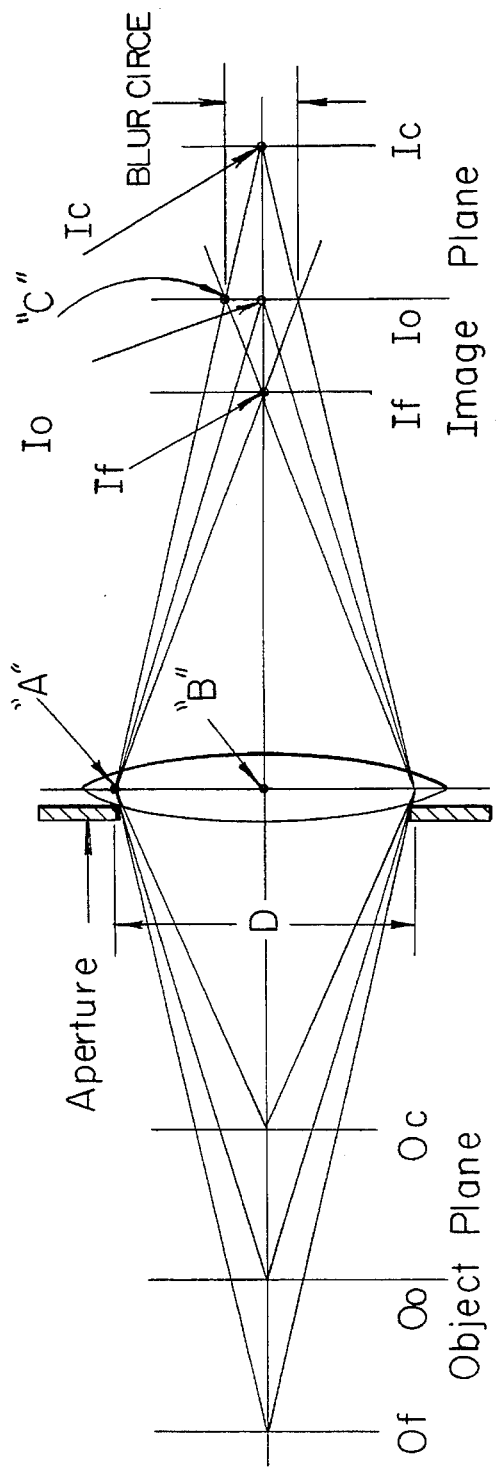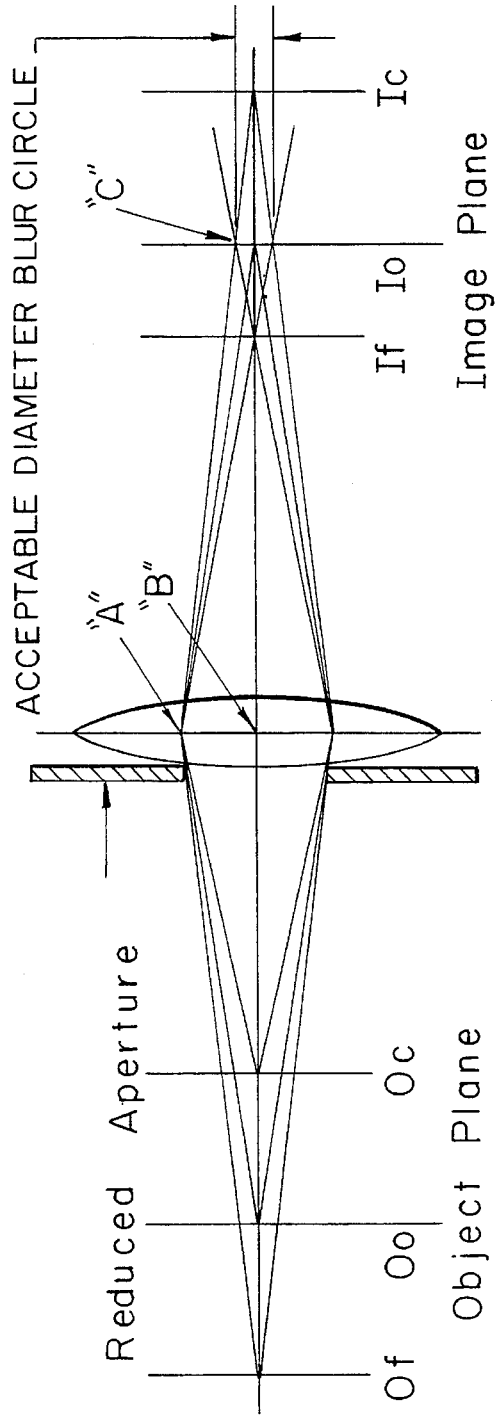

METHOD AND APPARATUS FOR VARIABLE VIDEO MAGNIFICATION

This application is a continuation of application Ser. No. 07/869,740, filed Apr. 16, 1992 U.S. Pat. No. 5,325,123.

BACKGROUND OF THE INVENTION

1. Field of the Invention

The invention relates to the field of optics. More particularly, the invention relates to video cameras. In still greater particularity, the invention relates to variable magnification video cameras. By way of further characterization, but not by way of limitation thereto, the invention relates to a variable magnification video camera achieved by mechanically stopping down the aperture size of the lens to allow variable magnification.

2. Description of the Related Art

Individuals with vision impairment have long sought aids to assist them in reading and performing other functions necessary in daily life. Many types of visual impairment caused by retinal deterioration are present in these individuals. One form of visual impairment is known as macular degeneration. Macular degeneration primarily occurs in elderly people and prohibits them from reading books or newspapers, etc. as well as labels, prescriptions, or other items which by necessity are desirable for a comfortable standard of living. Optical magnifying devices of many types have been used by these individuals to assist in these necessary functions. However, as retinal deterioration progresses, the limitations on magnifying capability limit the usefulness of these devices.

Video reading systems have become available in recent years. That is, the introduction of video cameras has made closed-circuit television devices useful to enable individuals with visual impairment such as macular degeneration to function normally. These devices magnify and enhance text or even photographs by displaying them greatly magnified on a video screen. This enables vision impaired individuals to more easily read text or view images. Available equipment ranges from small hand-held portable-type devices to large, fixed devices with variable magnification into which the object or text to be viewed is placed. For many of these individuals, the small hand-held portable devices are more desirable. However, these devices tend to be more limited in the functions which they are capable of performing. In particular, the ability to change magnification in the hand held devices is accomplished only through physically changing lenses or changing to a camera with a different lens. The ability to quickly change magnification is important for ease of use and because the text or image to be viewed may vary in size from word-to-word or line-to-line.

An example of a small hand-held video reading device is presently being marketed under the trademark Easy-Reader. This device is available in three fixed focused lens/camera options of 10 power, 20 power or 30 power. The device uses a video camera with a clear plastic extension which is placed against the text or image to be read. The clear plastic extension allows ambient light to fall upon the object to be magnified and allows the user to keep the camera the correct distance from the text or image to maintain correct focus of the text or image. Such a device is less expensive than a device such as the Chroma CCD offered by Telesensory, Inc. of Mountain View, Calif. The Chroma CCD model includes a fixed viewing system into which the item to be read is placed. The device then displays the image on a video monitor. Variable magnification is accomplished by adjusting a knob which controls a zoom lens in the viewing system. Each change of magnification generally requires refocusing unless the device is first very carefully focused at the highest magnification level, a practice which low vision users find difficult. This device offers the advantage of variable magnification as opposed to the Easy Reader-type device. However, while suited for its intended purpose, this device requires refocusing, is more cumbersome to use, and is significantly more expensive. That is, the unit is not hand-held or as portable as the Easy Reader device and is two or three times as costly. It would be desirable to have a relatively inexpensive, hand-held device which allows variable magnification for the visually impaired user.

SUMMARY OF THE INVENTION

The invention is a hand-held video camera which includes a stopped-down optical lens to increase the depth of field to limits defined by the acceptable blur circle of the user. This allows the user to move the camera toward or away from the text or image to be viewed thereby obtaining the desired magnification of that text or object. More specifically, the lens on the video camera is mechanically stopped down to a smaller aperture size to significantly increase the depth of field. By so doing, the depth of field defined by the acceptable blur circle of the visually impaired person is such that the camera may be moved an inch or more and the magnification may be changed thereby over a 4 to 1 range while acceptable focus is maintained. By mechanically stopping down the lens and increasing the depth of field thereby allowing movement of the camera the necessity for zoom optics to change the magnification is eliminated. At the same time, the advantages of a small, less expensive, hand-held device are maintained. The invention thus allows individuals with macular degeneration or other vision impairments which cause retinal deterioration to effectively view text or images.

The use of television cameras to project images onto a television screen is known. As previously discussed, such cameras have been previously used for vision impaired persons. However, as also previously noted, existing cameras are less than ideal in some situations. While a small hand-held camera would be preferred by most individuals, the variable magnification capability found with larger (and more expensive) units is very desirable.

BRIEF DESCRIPTION OF THE DRAWINGS

FIG. 4 illustrates the formation of a blur circle;

FIG. 5 illustrates the effect on the blue circle when the effective lens diameter is reduced.

DESCRIPTION OF THE PREFERRED EMBODIMENT

Figure 1:
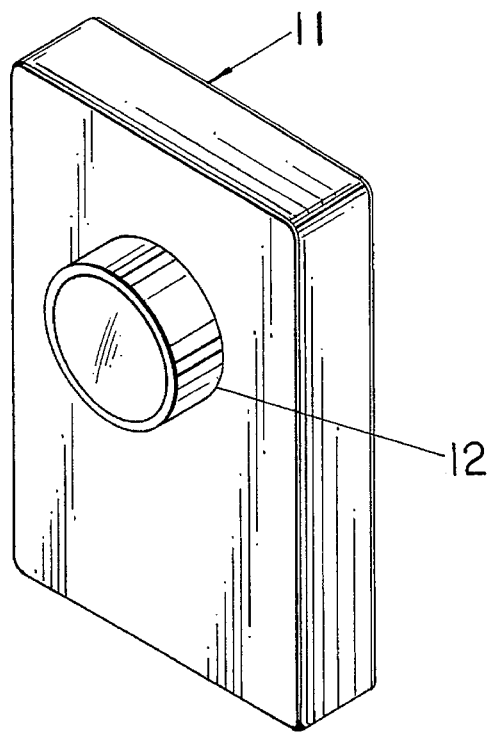
FIG. 1 is a perspective view of a video camera.

Referring to FIG. 1, the present invention includes a small commercially available camera 11. One suitable camera is the CX-101 camera manufactured by Chinon. Another suitable camera is the VM-210XL camera manufactured by Uniden Corp. Camera 11 includes a lens assembly 12. Lens assembly 12 may hold any one of a number of different focal-length lenses as appropriate for the application. With the above-described Chinon camera of the present invention, the lens specifications are as follows: The effective diameter is approximately 2.15 millimeters and the focal length is approximately 4.3 millimeters. This camera has previously been found useful for security applications and is primarily used in such applications.

Figure 2:
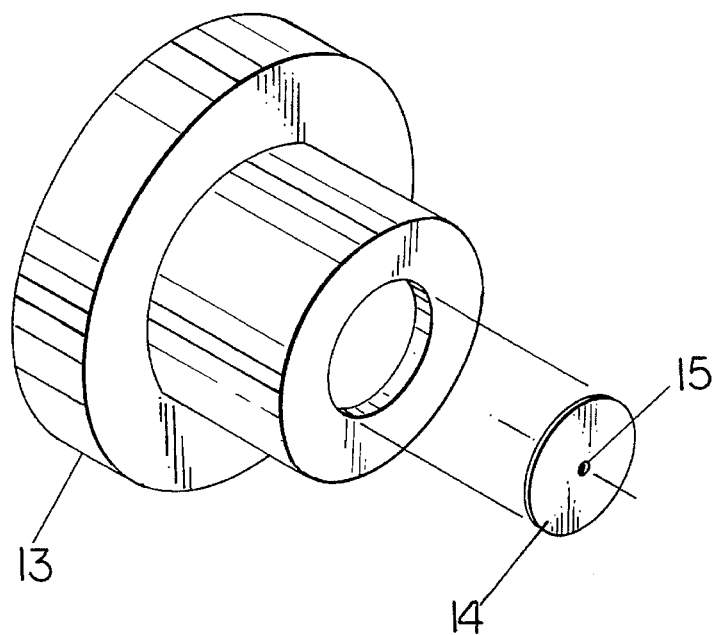
FIG. 2 is a perspective view of the lens assembly and the opaque material.

Referring to FIG. 2, the present invention modifies a lens 13 of lens assembly 12 by reducing or stopping down the effective lens diameter. That is, an opaque material 14 such as foil is placed over the rear of lens 13. It has been found that black opaque foil material such as BLACKWRAP™ available from The Great American market in Hollywood, Calif. is an especially preferred material. A small opening 15 is made in material 14 prior to securing it onto lens 13. Opening 15 is very small in comparison to the lens diameter. For example, in the preferred embodiment, lens 13 has a diameter of 2.15 millimeters while opening 15 has a diameter of 0.406 millimeters (0.016 inches) (about the diameter of a pin). Opening 15 may be made by laser cutting or other suitable methods known in the art. Material 14 is secured onto lens 13 by adhesive or by other suitable attachment means as is known in the art.

The effect of stopping down or reducing the aperture of lens 13 (and lens assembly 12) is two-fold. By reducing the effective aperture of lens 13, the depth of focus is increased. This increased depth of focus allows the camera to be moved closer to, or farther from, the object to be viewed which respectively increases or decreases the magnification of the object while keeping the object in relative focus. In this way, the effect of a zoom lens is achieved while the cumbersome (and expensive) mechanism associated with a zoom lens is eliminated.

In the preferred embodiment, lens 13 has a focal length of 4.3 millimeters while as stated, the aperture diameter in material 14 is 0.406 millimeters. Thus, the lens aperture ratio is 0.406 millimeters divided by 4.3 millimeters or 1/10.6. This is also known as the F number and is designated as F/10.6. As supplied, lens 13 has a F number of F/2. F numbers of 1.2 to 2 are common today in most television cameras. The reason for this is that lower F numbers require less light.

Figure 3:
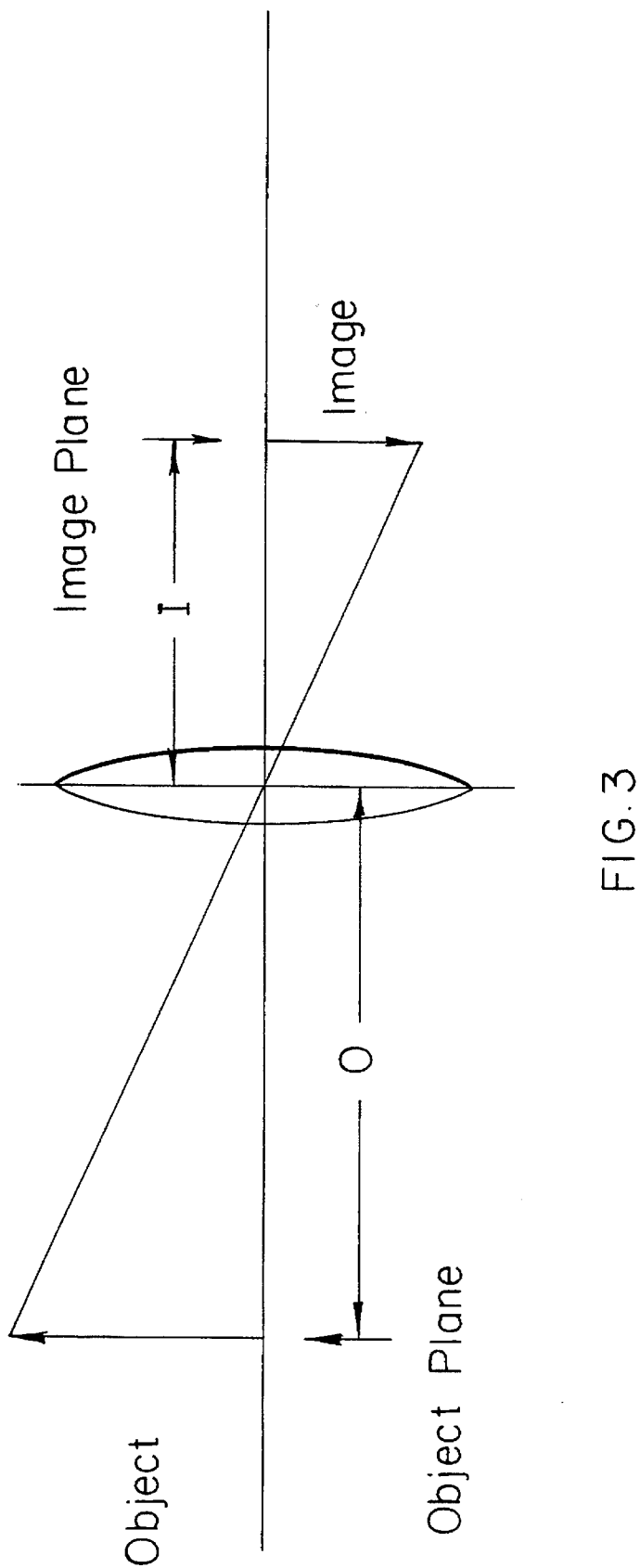
FIG. 3 illustrates the relationship of object size and image size.

FIG. 3 shows an object located at a distance O from a lens with a focal length F, and an image located at a distance I on the opposite side of the lens. The spacing of the image and the object are related by the lens formula, which is as follows: one divided by focal length equals one divided by object distance plus one divided by image distance.

$$\frac{1}{F} = \frac{1}{O} + \frac{1}{I}$$

Based on the relationship of similar triangles, object height is to object distance as image height is to image distance. This can be restated as image height divided by object height equals image distance divided by object distance. The term image height divided by object height is known as magnification.

$$\text{Magnification} = M = \frac{I}{O}$$

As the object distance changes, image height also changes. As the object is moved farther from the lens, the image becomes smaller, or has decreased magnification. Also, if the object is moved closer to the lens, the image becomes larger, or has greater magnification. A magnification of "one" indicates that the object and image are the same size. A magnification greater than one means the image is larger than the object. A magnification less than one means that the image is smaller than the object.

If a constant image distance is maintained, such as in a camera where the lens is a fixed distance from the film or sensing device, moving the lens closer to the object increases the image size, but the image will become blurry, since the focused image plane will now be in front of the film or sensing device, causing a blur circle. Similarly, if the lens is moved farther away from the object, image size will decrease, and the focused image plane will now be behind the film or sensor, causing a blur circle.

Some degree of blur circle, or out-of-focus condition is acceptable to most individuals. If the size of the blur circle is such that it is greater than the detail needed to understand the image, then the blur circle will be unacceptably large. There is therefore, some size of blur circle which will be acceptable to most individuals.

FIG. 4 shows a lens for which an object at the object plane distance $O_o$ corresponds to a sharply focused image at the image plane distance $I_0$. A blur circle at the image plane $I_0$ is caused by objects farther from and closer to the lens at distances $O_t$ and $O_c$.

Referring to triangle $ABI_c$ and $CI_0I_c$: The distance AB, which is one half of the lens diameter D, is to distance $BI_c$ just as one half of the blur circle is to $BI_c$ minus $BI_0$.

Similarly, referring to triangles $ABI_f$ and $CI_0I_f$: The distance AB is to the distance $BI_f$ just as one half of the blur circle is to $BI_o$ minus $BI_f$.

Using these basic relationships and combining them with the lens formula, it can be shown that the ratio of lens diameter to blur circle diameter, D divided by B, is as follows:

$$\frac{D}{B} = \frac{1}{1 - \frac{2(1 + M_f)}{(1 + M_f) + (1 + M_c)}}$$

Where $M_c$ equals the magnification at the image plane at its maximum, when the object is at its closest point to the lens, and $M_f$ equals the magnification at the image plane at its minimum, when the object is at its farthest point from the lens. It should be noted that this relationship is independent of the focal length of the lens and depends only upon the maximum and minimum magnifications desired.

Perfect uncorrected visual acuity is defined by the fact that an individual with 20/20 eyesight has the capability of resolving objects spaced apart by one minute of arc. If the lens of the eye can focus perfectly, the 1-minute-of-arc limitation is a consequence of the ability of the cellular structure of the retina of the eye to perceive detail. Although this structure differs somewhat from person to person, most young people, with correction for lens defects, can perceive at the 1 minute level. The designation 20/20 indicates that an individual can see at a distance of 20 feet that which a perfectly sighted individual can see at 20 feet. This translates to a separation of objects by 0.004 inches, or the diameter of a human hair, at a distance of 15 inches, and is typical of the finest detail which can be seen by a person with 20/20 vision without correction. An individual with 20/40 vision can see at 20 feet that which a perfectly sighted individual can see at 40 feet; an individual with 20/15 vision can see at 20 feet that which a perfectly sighted individual can see at 15 feet. A non-correctable visual acuity level of 20/200 is considered legal blindness in the United States. A person with non-correctable 20/200 vision can only resolve objects spaced apart by 10 minutes of arc or greater.

A practical lower limit of resolution needed to function without any difficulty is about two minutes of arc, and corresponds to a visual acuity of 20/40. With vision worse than 20/40, correction is generally needed to function. For most individuals, this correction is possible with eyeglasses. Eyeglasses correct for the inability of the lens of the eye to focus correctly. Once this focusing defect is corrected, the ability to perceive detail at the 20/20 level is restored.

However, visually impaired individuals, in addition to possible defects in the focusing ability or clarity of the eye lens, have damage to the central and/or other portions of their retina. The central portion of the retina, or macula, contains the vision cells required for detailed vision. When central retinal damage exists, correction of only the focusing ability of the eye lens will not restore vision to the 20/20 level since the cells in the retina which are required to perceive this detail no longer function. In cases of retinal damage, visual acuity is determined by the degree of damage to the retina, and not by the condition of the eye lens. This damage appears to the individual as a blind-spot, usually, but not exclusively, located at the center of their visual field. Just as the ability to perceive detail in a normal individual is controlled by the limitation of the retina, the limitation in the visually impaired is controlled by the limitation of a damaged retina. Since the retina, and not the lens is the controlling factor, corrections to the focusing ability of the lens by use of eyeglasses will not restore vision to a 20/20 level. Such individuals have non-correctable visual impairment.

The severely visually impaired, by definition, have non-correctable visual acuity of 20/200 or worse, and are considered legally blind. They are only capable of separating objects spaced by 10 times the spacing of a non-vision impaired person, or by 10 minutes of arc. As a result, when a severely visually impaired individual watches a 12 inch television set from a distance of 20 inches, they cannot see detail finer than 10 minutes of arc at a distance of 20 inches, or slightly less than $1/16$ inch. Detail any finer than $1/16$ inch cannot be distinguished. This limitation makes it impossible to read normal printed material, since the detail necessary to understand the printed letters is finer than the ability to perceive. Under these circumstances, magnification can help. If the printed letters are increased in size, their image on the retina will be large compared with the retina's ability to perceive detail, or stated differently, the individual's blindspot is small compared with the size of the print, and the print can thus be perceived. In early stages of retinal damage, low magnification, such as 2 times, helps. AT 20/200, magnification of 10 times is necessary to restore perception to normal. However, to achieve even 10 times magnification with an optical magnifier, the magnifier must be used in extremely close spacing to the material being magnified, and will have a field of view of only one or two letters of normal printed material. Both the close spacing and the limited field of view make such a magnifier extremely difficult to use. Magnifications greater than 10 times are necessary to compensate for visual impairment greater than 20/200. By definition, for full compensation, magnification of 40 times would be necessary to compensate for visual acuity of 20/800.

The $1/16$ inch acuity limitation in the severely visually impaired is equivalent to the ability of a normally sighted individual with 20/20 vision to distinguish detail as small as 0.006 inches at the same 20 inch distance. As with a normally sighted individual, the acceptable blur circle will be about twice the minimum perceptible, or about $1/8$ inch. As previously noted, the blur circle only becomes a problem when it is larger than the detail needed to understand the image. Therefore, although to fully compensate for visual impairment over a range of 20/200 to 20/1000 on a 12 inch video monitor magnification from about 10 times to about 50 times is needed, acceptable magnification levels can be half that value, or from about 5 times to about 25 times. This will correct vision to 20/40. Such magnifications are easily achievable using a television camera with the proper lenses and a television set to present the image. For a larger video monitor such as a 25 inch screen the magnification would be double or 10 to 50 times. However, since the viewer normally sits farther away from a larger screen, the effect is similar to that with the 12 inch screen.

In using a television camera to provide magnified images on a television set, the image goes through two stages of magnification. The first is the magnification ratio between the object being viewed by the television camera lens and the image created on the television, camera sensing device. The second magnification ratio is the ratio between the size of the television camera's sensing device and the size of the television set used to view the image. Since an image which completely fills the television camera's sensing device also fills the television screen, this second magnification ratio is equal to the size of the television set divided by the size of the television camera sensor. The overall magnification ratio between the object being viewed by the camera lens and the image on the television set is the product of the two magnification ratios.

As an example, a typical television camera sensing device measures $1/3$ inch in diameter. Generally, low resolution results from sensing devices less than $1/3$ inch diameter. Generally, sensing devices greater than $2/3$ inch, although available, are not generally used because of cost considerations. It should be noted, however, that the disclosed invention may be utilized with sensing devices of any size. If the image is to be shown on a 12 inch television set, the second magnification ratio is therefore 12 divided by $1/3$, or 36 times. The first magnification ratio is determined by the practical overall magnification necessary to fully compensate (return effective acuity to 20/20) for individuals with visual acuities from about 20/120 to 20/480 when using a 12 inch television set. By definition, this requires magnifications of from 6 times to 24 times. As a practical matter, individuals need not be returned to effective 20/20 vision, but can be comfortable with a correction to 20/40, as previously noted acceptable for most individuals. This tolerance increases the effective range of magnification so that individuals with vision in the range of 20/60 to 20/960, or the full range of people who are visually impaired, can benefit greatly from magnifications in the range between 6 and 24 times. (Beyond 20/900, an individual is generally considered totally blind.)

If overall magnification ranges from 6 to 24 times, and the magnification from the television camera sensor to the television set is 36 times, the magnification ratio range from the object being viewed to the television camera sensor is 6 divided by 36, or $1/6$, to 24 divided by 26, or $2/3$. This means that the image on the sensor of the television camera is actually smaller than the object being viewed by the camera. The overall magnification is therefore $1/6$ times 36, or 6 times, to $2/3$ times 36, or 24 times. With a $2/3$ inch sensing device and a 12 inch monitor the magnification ratio range is ⅙ to 1.33. Similarly, a ⅓ inch sensing device and a 24 inch monitor yields a range of 1/12 to ⅓.

Using the ratio of the size of the television set to the size of the image sensor as 1/36, the ⅛ blur circle on the television screen translates to a ⅛ inch divided by 36 blur circle on the television camera sensor, or 0.00347 inches.

Using the equation for the lens diameter to blur circle ratio, D/B, and substituting magnification ratios of ⅙ minimum and ⅔ maximum, a D/B/ratio of 5.667 is calculated. Multiplying this ratio by the acceptable blur circle for visually impaired individuals of 0.00347 inches at the television camera sensor yields a maximum lens diameter of 0.019 inches. This lens diameter is the maximum possible to achieve magnifications over the range from 6 to 24 times on a 12 inch television set while maintaining an acceptable blur circle of ⅛ inch on the television set. FIG. 5 demonstrates how the blur circle is reduced to an acceptable size by reduction in the size of the lens aperture. That is, the lens aperture of FIG. 4 is stopped down to a reduced lens aperture in FIG. 5 by using an opaque material 15. This allows the blur circle to be kept at an acceptable diameter while allowing the image and object distances to remain the same as FIG. 4 thus maintaining the desired magnification range.

In actual practice, it is possible to reduce lens diameters below this maximum level to improve resolution. In the present embodiment of this camera, the lens diameter is actually 0.016 inches, resulting in a blur circle on the television screen of about 0.1 inches, substantially below that perceptible by visually impaired individuals, and enabling a magnification range of from 6 to 24 times simply by moving the camera closer to or farther away from the object being viewed, without any necessity to refocus the lens, and without the need to use expensive zoom lenses.

A practical embodiment of the application of these premises uses a Chinon CX101 camera; a lens with a focal length of 4.3 mm; a stopped-down aperture of 0.406 millimeters and a light source capable of providing sufficient light for the reduced aperture resulting in the ability to move the camera over a distance of almost I inch while maintaining focus within a blur-circle to focal length ratio of 0.01", well within the acceptable range for a person with 20/200 vision. Moving the camera through this range results in image size changes which, when viewed on a 12 inch TV set, range from magnifications of 6 times the viewed object to 24 times the viewed object. Such magnifications are greater than those for usual optical devices, and are sufficient to compensate for most visual impairment caused by loss of visual acuity.

The effect of the above is that the user is free to change the magnification of the image displayed on the television semen over a 4 to 1 range simply by moving the camera a one inch distance toward or away from the object being viewed. In addition to allowing the user to select a preferred magnification this capability allows the user to effectively mad type which changes in size without the cumbersome task of readjusting a zoom lens or physically changing camera lenses. That is, if in the same page of text or image the print size or image size varies such that the user desires to maintain the same size image on the video screen, he or she may do so simply by moving the camera toward or away from the object rather than being required to adjust a zoom lens or physically change lenses or cameras. For prior art hand-held devices not containing a zoom lens such change in magnification is not possible within the acceptable blur circle boundaries. That is, if the prior art camera is moved toward or away from the object to be magnified, the image quickly goes so badly out of focus such that the image is unreadable even to a visually impaired person.

Figure 6:
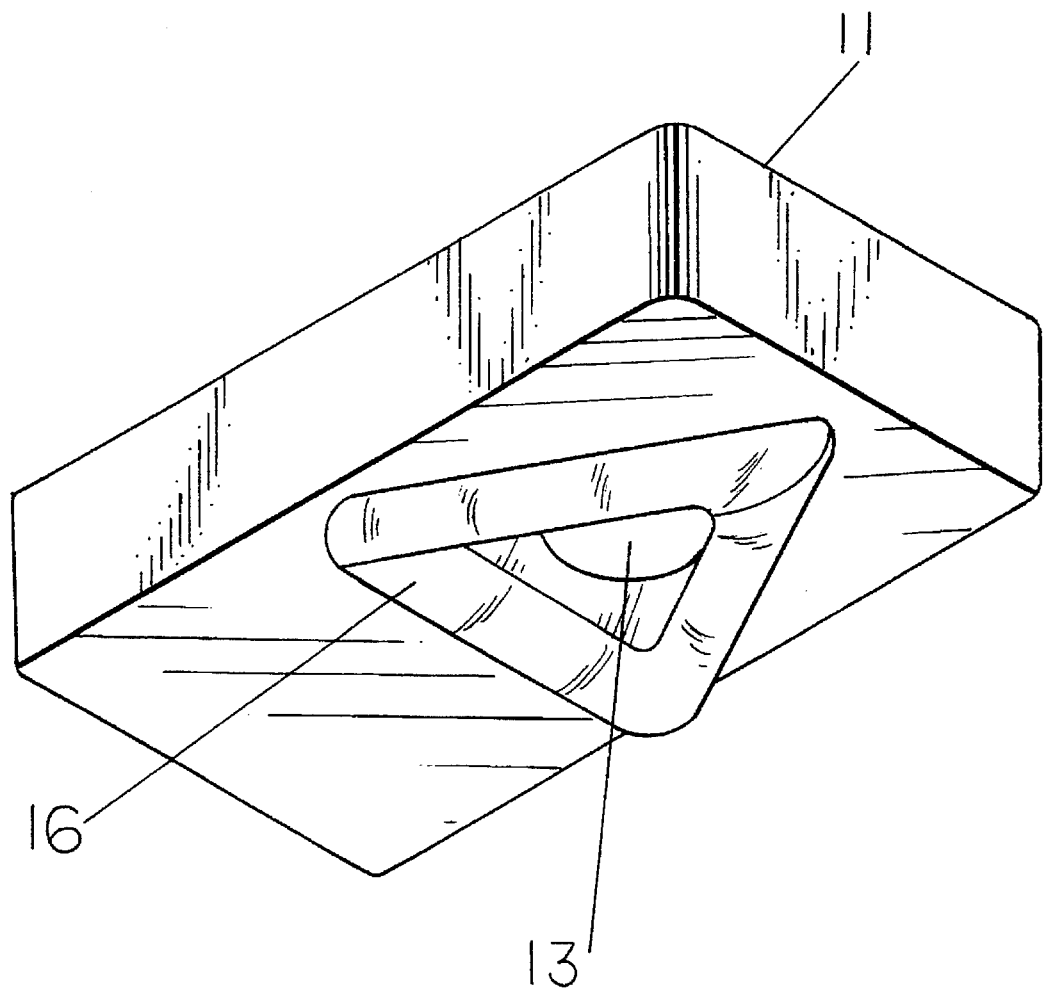
FIG. 6 is a perspective of the video camera with added lighting.

The one difficulty which may be created by reducing the aperture diameter is that less light is transmitted into the camera. The transmitting power of a lens is characterized by the ratio of the diameter of the effective aperture to the focal length. This is called the lens aperture ratio or relative aperture of the lens. In the present case with the Chinon camera the lens aperture ratio, the so-called F number, is F/2 as supplied. After the aperture has been stopped down by material 14 to 0.406 millimeters, the F number is approximately F/10.6. Because an aperture with half the diameter has only a quarter of the area of the initial aperture and, therefore, admits only a quarter of the initial amount of light into the camera, the ratio of F number to the light required is such that each increase in F number by a factor of √2 corresponds to a reduction of about one-half of the light transmitting power of the lens. By increasing the F number from F/2 as supplied to approximately F/10.6, approximately 28 times as much light is needed for the same quality of picture. That is, the F/2 lens is approximately 28 times "faster" than a F/10.6 lens. Thus, an additional light source may be needed in the present invention to allow viewing of an object. Referring to FIG. 6, camera 11 is shown in a housing with the addition of light unit 16. This light unit incorporates commercially available cold-cathode fluorescent lights, such as arc used for back-lighting Liquid Crystal Displays in portable computers. These lamps are mounted in a clear plastic housing, positioned in a triangular pattern around lens 13 and fastened to the housing 11. This lighting unit provides close-up illumination of the objects to be magnified and provides sufficient light to compensate for the increase in F/number.

As stated above, the invention described herein allows visually impaired people with retinal deterioration to use a small hand-held video camera to view text or other images on a television screen with the additional capability of changing the magnification of the image viewed on the television screen simply by moving the camera toward or away from the text or image. The result is a small hand-held device which is relatively inexpensive and offers the features of much larger devices with the convenience of the small portable hand-held device.

While the disclosure is made with respect to a preferred embodiment thereof, changes or modifications may be made which are within the full intended scope of the invention as denoted by the appended claims. For example, different cameras and lenses may be utilized. In addition, while the invention disclosed herein utilizes additional lighting, such may not always be required. Improvements in video cameras with respect to light sensitivity are such that it is anticipated that future small video cameras which may be utilized with the present invention will be light sensitive enough such that the additional lighting will not be required. In addition, while the preferred embodiment of the invention utilizes a Chinon camera, it is not to be so limited as other cameras such as the above-mentioned Uniden camera or others may be utilized. While disclosed for use with a 12 inch monitor, it should be appreciated that the invention may be used with larger or smaller screens. As discussed, the actual magnification would vary with screen size. However, at least a two-to-one magnification range can be maintained with the present invention while maintaining an acceptable blur circle ratio. The invention resides in the stopping down of the aperture size to allow greater depth of focus and camera movement to change magnification within the acceptable blur circle of the visually impaired person.

What is claimed is:

1. In a device for the visual impaired including a video system, a video camera including a lens and an image sensing device whereby light rays from an object defined by an object size are transmitted along an optical axis onto said image sensing device as an image after passing through said lens, said image sensing device cooperative with said video camera to project said image onto a video monitor said projected image defined by an image size, whereby movement of said video camera toward or away from said object results in varying said image size with respect to said object size, the improvement comprising:

an opaque material positioned adjacent to said lens, substantially perpendicular to the optical axis of said lens, said opaque material having an aperture of a predetermined size substantially centered on the optical axis of said lens, and said aperture being of a diameter substantially less than said lens such that the ratio of said image size to said object size is varied from at least 2 to 1 while said projected image is maintained within an acceptable blur circle diameter of 1% of the screen size of the video monitor operatively connected to said video camera.

2. A video system according to claim 1 wherein said image sensing device is of a size from about 0.33 to about 0.67 inches in diameter.

3. A video system according to claim 1 wherein said aperture is about 0.016 inches.

4. A video system according to claim 1 wherein said video monitor includes a 12 inch diagonal screen.

5. A video system according to claim 1 wherein an image size projected on said video monitor may be varied from about 6 to 24 times the size of an object sensed by said image sensing device, said image size being varied by moving said video camera toward and away from said object over a distance of about one inch.

6. A video system according to claim 5 wherein said image size may be varied while maintaining said image within an acceptable blur circle diameter.

7. A video system according to claim 6 wherein said blur circle diameter is about 0.1 inches.

8. In a device for the visually impaired, a method for viewing an object defined by an object size including the steps of positioning a video camera in a path to receive light rays from said object, transmitting said light rays through a lens on said video camera, sensing said light rays, projecting said sensed light rays onto a video screen as an image defined by image size, and moving said video camera toward or away from said object to vary said image size on said video screen, the improvement comprising: an opaque material positioned adjacent to said lens, substantially perpendicular to the optical axis of said lens said opaque material having an aperture of a predetermined size substantially centered on the optical axis of said lens; stopping down the aperture size of said lens such that the ratio of said image size to said object size is at least 2 to 1 while said projected image is maintained within an acceptable blur circle of 1% of the screen size of the video monitor diameter.

9. Method according to claim 8 wherein said video monitor includes a 12 inch diagonal screen.

10. Method according to claim 8 wherein the aforesaid step of moving includes varying the distance of said lens assembly from said object over a range of about one inch.

11. Method according to claim 8 wherein said image size is varied from about 6 to 24 times said object size.

12. Method according to claim 10 wherein said image size is varied from about 6 to 24 times said object size.

13. Method according to claim 8 wherein said blur circle diameter is about 0.1 inch.

* * * * *